US008032525B2

(12) United States Patent
Bowers et al.

(10) Patent No.: US 8,032,525 B2
(45) Date of Patent: Oct. 4, 2011

(54) EXECUTION OF SEMANTIC QUERIES USING RULE EXPANSION

(75) Inventors: Stuart M. Bowers, Redmond, WA (US); Chris Demetrios Karkanias, Sammamish, WA (US); David B. Wecker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 12/416,103

(22) Filed: Mar. 31, 2009

(65) Prior Publication Data

US 2010/0250576 A1 Sep. 30, 2010

(51) Int. Cl.
G06F 17/30 (2006.01)
(52) U.S. Cl. ........................................ 707/722; 707/717
(58) Field of Classification Search .................. 707/717, 707/722
See application file for complete search history.

(56) References Cited

U.S. PATENT DOCUMENTS

| 7,386,541 B2 | 6/2008 | Pal et al. | |
|---|---|---|---|
| 2006/0206477 A1 | 9/2006 | Dalvi et al. | |
| 2008/0140387 A1* | 6/2008 | Linker | 704/9 |
| 2008/0319947 A1* | 12/2008 | Latzina et al. | 707/3 |

OTHER PUBLICATIONS

Georg Gottlob, Nicola Leone and Francesco Scarcello, The Complexity of Acyclic Conjunctive Queries, May 2001, pp. 1-3, Journal of the ACM, vol. 48 Issue 3.*
Mathis, et al., "XTCcmp: XQuery Compilation on XTC", 34th International Conference on Very Large Data Bases, retrieved at <<http://wwwlgis.informatik.uni-kl.de/cms/fileadmin/users/mathis/documents/vldb_demo_08.pdf>>, vol. 1, No. 2, Aug. 24-30, 2008, pp. 1-4.
Kay, Michael, "XSLT and XPath Optimization", retrieved at <<http://www.saxonica.com/papers/xslt_xpath.pdf>>, 2001, pp. 1-3.
Falconer, et al., "A Declarative Framework for Analysis and Optimization", in Compiler Construction, Lecture Notes in Computer Science, retrieved at <<http://www.doc.ic.ac.uk/~phjk/Publications/DeepWeaver-CC07.pdf>>, vol. 4420, date: 2007, pp. 1-15.
Bednarek, David, "Extending Datalog to cover XQuery", Proceedings of the Conference on Theory and Practice of Information Technologies, retrieved at <<http://ftp.informatik.rwth-aachen.de/Publications/CEUR-WS/Vol-414/paper1.pdf>>, Sep. 2008, pp. 1-6.
Rondogiannis, et al., "The Branching-Time Transformation Technique for Chain Datalog Programs", Journal of Intelligent Information Systems, retrieved at <<http://cgi.di.uoa.gr/~prondo/papers/jiis.pdf>>, Jul. 26, 2001, pp. 71-94, Kluwer Academic Publishers, The Netherlands.
Whaley, et al., "Using Datalog with Binary Decision Diagrams for Program Analysis", In Proceedings of Programming Languages and Systems: Third Asian Symposium, retrieved at <<http://suif.stanford.edu/papers/aplas05.pdf>>, 2005, pp. 1-22. Bishop, et al., "IRIS—Integrated Rule Inference System", Proceedings of the Workshop on Advancing Reasoning on the Web: Scalability and Commonsense, retrieved at <<http://ftp.informatik.rwth-aachen.de/Publications/CEUR-WS/Vol-350/paper2.pdf>>, Jun. 2008, pp. 1-15.

* cited by examiner

Primary Examiner — Cheryl Lewis

(57) ABSTRACT

A semantic query may refer to a logical rule, where the rule is defined in terms of constituent expressions. In order to execute the semantic query efficiently, occurrences of the rule may be expanded by replacing the rule with its constituent expressions. Expansion may be performed repeatedly, until only grounded expressions remain. Expressions are grounded when they refer to tables or views that are represented in an underlying database. Once the rule has been reduced to grounded expressions, the semantic query processor may formulate a relational query in terms of the grounded expressions. If the relational query takes into account the various grounded expressions to which the rule reduces, then the portion of the semantic query that refers to the rule may be processed without an excessive number of round trips to the relational database.

20 Claims, 4 Drawing Sheets

Condition ⎯ 102

| Subject | Object |
|---|---|
| Diag001 | Type II Diabetes |
| Diag002 | Heart Murmur |
| Diag003 | Cephalalgia |

Diagnosis ⎯ 104

| Subject | Object |
|---|---|
| Patient001 | Diag001 |
| Patient002 | Diag002 |
| Patient003 | Diag003 |
| Patient004 | Diag004 |

Name ⎯ 106

| Subject | Object |
|---|---|
| Patient001 | Donovan Turner |
| Patient002 | Owen Kaminski |
| Patient003 | Charles Dvorshak |
| Patient004 | Scott Caldwell |

```
diagnosis_with_condition(Pat,Cond) :-
    diagnosis(Pat,Diag), condition(Diag,Cond)
```

*FIG. 2*

EXECUTION OF SEMANTIC QUERIES USING RULE EXPANSION

BACKGROUND

In some data models, such as the Resource Description Framework (RDF), data is represented in the form of triples having a subject, an object, and a predicate. In this model, data is a set of logical facts, in which the subject and object are each some entity, and a predicate is a relation that exists between the entities. For example, give a list of people (the entities), predicates could be used to define family relations among the people—e.g., "Alan is a brother of Bob," "Bob is a father of Charlie," etc. These relations could be written in a predicate/argument format, such as that used in Prolog or Datalog—e.g., "brother(Alan,Bob)", "Father(Bob, Charlies)", etc. In fact, many systems that store data in this manner are coupled to, or incorporate, logic programming languages, and can perform sophisticated logical reasoning on the facts represented by the triples.

In one example, a system implements a semantic query language such as SPARQL (which stands, recursively, for "SPARQL Protocol and RDF Query Language"), which allows the client to specify declarative queries in terms of logical reasoning to be performed on the triples. A logic engine, such as a Datalog engine, may be used to carry out the reasoning. However, the actual information on which the reasoning is to be performed—e.g., the subject/predicate/object triples—may be stored in a relational database. When the client processes a semantic query such as a SPARQL query, it may issue relational queries (e.g., Structured Query language, or "SQL," queries) to the relational database to retrieve the appropriate triples from the relational database, and then may perform logical reasoning on the retrieved triples.

Since the client includes an implementation of logic, such as a Datalog engine, logical rules may be defined, and base facts (e.g., triples that are stored in a database) may be used as part of the rule definition. For example, even if there are no underlying "uncle" triples in the database, one might define a rule such as "Uncle(A,B):-Brother(A,C); Father(C,B)". (In other words, "A is the uncle of B, if A is the brother of C and C is the father of B.") A client that responds to semantic queries (e.g., a SPARQL engine) could issue relational queries to obtain the underlying Brother and Father relations from the database, and could then perform the appropriate reasoning on the obtained information. However, some naïve implementations of the semantic query engine neglect certain opportunities to optimize use of the underlying relational database and its relational query processor.

SUMMARY

A semantic query engine may receive a query that specifies certain information to be derived from relations. Each of the relations may involve a subject, an object, and a predicate. Some of the relations may correspond to underlying tables or views that are stored in a relational database. Other relations may be rules that are defined in terms of underlying relations. The semantic query engine answers the query by issuing relational queries to retrieve information from the relational database, and by performing logical reasoning on the information that has been retrieved. When semantic queries (e.g., SPARQL queries) are written in terms of logical rules rather than underlying tables, the semantic query engine may execute the query in ways that involve making many round trips to the relational database.

The execution of a semantic query may be optimized by expanding expressions in the query that involve rules into the underlying relational tables or views in terms of which the rules are defined. For example, if X and Y are underlying tables or views in a relational database, and "R(A,B):-X(A,C); Y(C,B)" is a rule defined in terms of those tables or views, then queries involving rule R can be expanded into their underlying components. Rules may be defined in terms of underlying tables or views, but they could also be defined in terms of other rules. If the expansion of a rule yields another rule, then the expanded terms may be recursively expanded until the expansion yields expressions that are grounded in terms of underlying relational tables or views. Rules that are defined recursively may be treated differently from rules that are defined non-recursively, in order to ensure that the expansion process terminates.

Once a semantic query has been expanded into its underlying grounded terms, the semantic query engine may formulate a relational query that answers the semantic query by performing simple joins on the underlying tables or views. Thus, some round trips between the semantic query engine and the relational database may be avoided, thereby increasing the efficiency of processing the semantic query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows an example set of tables that represent predicate-relation tuples.

FIG. 2 is a block diagram of an example logical rule.

DETAILED DESCRIPTION

Figure 3:
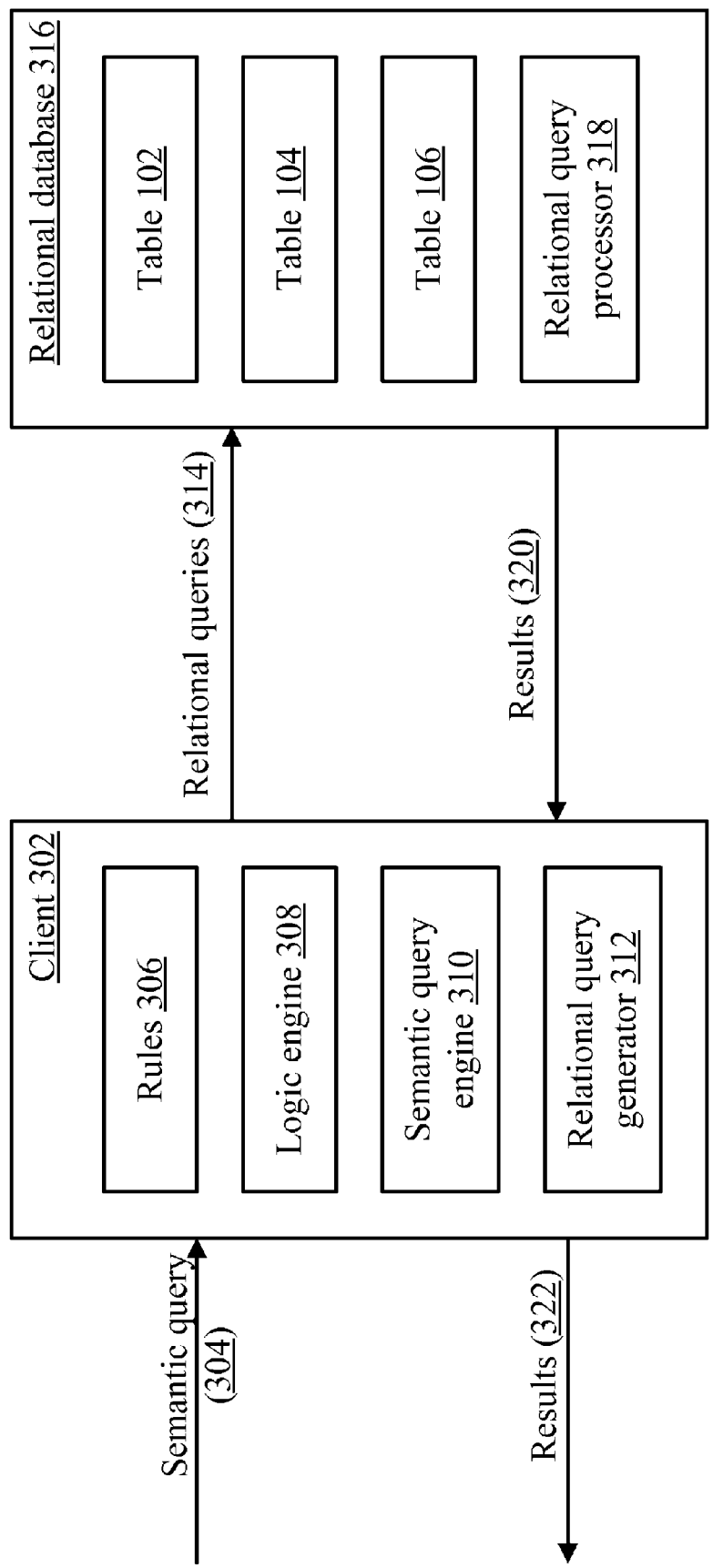
FIG. 3 is a block diagram of an example scenario in which a client processes semantic queries by issuing relational queries to a relational database.

Some data models represent data in the form of triples having a subject, and object and a predicate. There are various models that use predicate-relation tuples to represent information; RDF is one example of such a model. Thus, in an RDF database, sets of entities and relations are defined, and data takes the form of relations that exist between the entities. Thus, if Alan and Bob are entities within an RDF database, then "Alan is a brother of Bob" is an example of a fact that might exist in the database. This fact might be represented in the form Predicate(Subject,Object)—e.g., Brother(Alan, Bob). Tables or views in a relational database might be used to store all of the "Brother" relations. Thus, any semantic query that is written in terms of the Brother relation refers to a term that is grounded in the relational database. A table or view could exist that corresponds to each different relation, so there might be a table for the Brother relations, another one for the Sister relations, others for Father, Mother, Friend, etc.

When a query involves only grounded terms, translating a semantic query into an efficient relational query is relatively simple, since the query can be calculated using joins, which can be executed efficiently by a relational database. For example, if one writes a semantic query seeking all of the brothers of Fred's father, this query is easily translated into the relational algebraic expression $\pi_{Brother.subject}$ (Brother$\bowtie_\phi$Father), where $\phi$=(Brother.object= Father.subject$\wedge$Father.object="Fred"), which provides a list of all of the brothers of Fred's father. This algebraic expression can be specified by a SQL query, such as:

SELECT t0.subject

FROM Brother AS t0,Father as t1

WHERE t0.object=t1.subject AND t1.object="Fred".

This query can be executed by any relational database that provides a SQL language interface.

However, a semantic query engine might allow one to define a logical rule in terms of the relations that are stored in the database. The semantic query engine may have the capability to reason using the logical rules, but the rules may be unknown to the relational database in which the data is stored. Even if the relational database stored the logical rules (e.g., by storing expressions of these rules in tables in the database), logic programming is generally not part of the relational model, and thus the relational database's query processor may be unable to express queries that involve Prolog- or Datalog-type reasoning. So, if a semantic query engine recognizes logical rules and allows these rules to be used in semantic queries such as SPARQL queries, the semantic query engine has to generate appropriate relational queries to carry out the logic specified by the rules.

Sometimes, the relational queries that are used to carry out a logical rule are quite cumbersome, and involve many round trips between the semantic query engine and the relational database. For example, with reference to the Father/Brother example above, the brothers of Fred's father are Fred's uncles. Thus, one might define the rule:

Uncle(Unc,Neph):-Brother(Unc,Dad);Father(Dad, Neph).

Thus, in order to get a list of Fred's uncles, one might issue a SPARQL query such as:

```
        SELECT ?Unc
        WHERE {
            ?Unc    Uncle    Fred
        }
```

In rough translation into English, this query roughly means "Find all entities, Unc, for which the fact 'Unc is an uncle of Fred' is true." One can issue this query without regard to whether "Uncle" is a rule or a grounded expression. However, when a SPARQL query engine executes the query by issuing appropriate relational queries to the relational database, it has to issue relational queries in terms of structures that actually exist in the relational database.

The naïve way to execute the SPARQL query above is to issue separate relational queries on the Brother and Father relations in the order in which they appear. For example, when the SPARQL engine sees that the query involves the Uncle rule, it may look up the Uncle rule and determine that the first premise in the Uncle rule is "Brother(Uncle,Dad)". Thus, the SPARQL engine may start by finding all of the people who are uncles of anyone, and whom they are the uncles of. This may be performed by issuing the query:

SELECT t0.subject,t0.object

FROM Brother AS t0.

In other words, this query simply retrieves the Brother table in its entirety. Since the Uncle rule equates the object of the Brother relation with the subject of the Father relation, the SPARQL query engine may then attempt to determine, for each object listed in the Brother table, which rows in the Father table have that object as their subject and also have Fred as their object. For example, if a given row in the Brother table shows that Henry is a brother of Joe (i.e., Brother(Henry, Joe), then—for that specific row—it can be determined whether Henry is Fred's uncle by executing the relational query:

SELECT t0.subject,t0.object

FROM Father AS t0

WHERE t0.subject="Joe" AND t0.object="Fred".

A problem that arises, however, is that a query of this form would have to be formulated and executed for every row in the brother table that was retrieved as part of the first query. So, if the brother table contains ten rows identifying ten different objects of the brother relation $(B_1, \ldots, B_1)$, then ten separate queries would have to be issued to the relational database, each asking whether $B_k$ is Fred's father, for all values of k between 1 and 10. Thus, execution of the semantic query involves issuing eleven separate queries to the relational database in order to answer the semantic query.

Execution of the semantic query could be performed more efficiently if the semantic query engine recognized the expanded form of the rule and acted accordingly. That is, if the semantic query engine recognizes that, under the definition of the "Uncle" rule, the query

```
        SELECT ?Unc
        WHERE {
            ?Unc    Uncle    Fred
        }
``` is actually the same query as

```
        SELECT ?Unc
        WHERE {
            ?Unc   Brother   ?Dad
            ?Dad   Father    Fred
        }
``` and further recognized that Brother and Father are grounded terms in the underlying relational database (i.e., tables or views whose cells have specific values), then the semantic query processor would easily recognize that answering the query is a simple join of the Brother and Father tables, and could obtain an answer the semantic query by issuing a single query to the relational database.

The subject matter herein may be used to expand semantic queries into grounded terms, so that the queries may be converted into efficient relational queries. In general, when a semantic query is written in terms of a rule, the rule is expanded into its constituent terms by replacing the rule with the constituent terms in which the rule is defined. By performing this expansion, a query involving a rule can be responded to efficiently. In some cases, it is possible to obtain an answer to the semantic query by issuing a single relational query to the relational database, even if, in the absence of expansion, answering the query would have involved repeated trips to the relational database.

If the constituent terms are also rules, the expansion process continues until ground terms are reached. When rules are defined recursively, additional processing may have to be performed for the expansion to reach a grounded term, but rules that are defined non-recursively can be addressed through simple expansion that is applied repeatedly until ground is reached.

Turning now to the drawings, FIG. 1 shows an example set of tables that represent predicate relation tuples (such as RDF triples). In the example of FIG. 1, three relations are shown, where the relations are named "condition," "diagnosis," and "name." Table 102 stores instances of the "condition" relation (i.e., instances of subject-object tuples that are related by the "condition" relation). Table 104 shows instances of the "diagnosis" relation. Table 106 shows instances of the "name" relation. The tables shown relate to an example set of medical records relating to conditions and/or treatment of the human body. In one data model, the columns of each table represent the subject and object of a given relation, so each of tables 102-106 has a column labeled "subject" and a column labeled "object." Thus, each row of tables 102-106 defines a particular subject/object pair that is related by a given predicate—e.g., according to table 106, the subject "Patient003" and the object "Charles Dvorshak" are related by the predicate called "name". Tables 102-106 may be stored, for example in a relational database.

In this example, individual patients are given identifying codes (e.g., "patient001", "patient002", etc.) in order to distinguish each patient from other patients. Similarly, the various different diagnoses that can be made are given identifying codes (e.g., "diag001", "diag002", etc.). Condition table 102 associates a specific diagnosis code with its verbal description—e.g., "diag001" means "Type II Diabetes", "diag002" means "Heart Murmur", etc. Name table 106 associates each patient code with the name of the a patient—e.g., "patient001" corresponds to "Donovan Turner", "patient002" corresponds to "Owen Kaminski", etc. Diagnosis table 104 associates a specific patient (identified by patient code) with a specific diagnosis (identified by diagnosis code). Thus, one can find a specific patient's diagnosis by first looking up the row that has the patient's identifier in the subject column of table 104, then by finding the diagnosis code by looking in the object column of that row, and then by looking up the English description of the diagnosis code in condition table 102.

Tables 102-106 do not include a table that correlates verbal descriptions of diseases with patients who have those diseases. Although there is no table, in this example, that stores that information directly, it is possible to reason this information from the tables that do exist. For example, one might define a logical rule that relates a patient identified with the English description of the condition with which the patient is diagnosed. The rule:

diagnosed_with_condition(Pat,Cond):-diagnosis(Pat, Diag),condition(Diag,Cond)

defines the relationship between a patient identifier and an English description of a condition. FIG. 2 shows this example rule 202. Specifically, a patient identifier (Pat) is associated with a particular verbal description of his or her condition (Cond) if the diagnosis table associates that patient with a specific diagnosis code (Diag), and if the condition table associates that diagnosis code with the verbal description (Cond). (Pat, Diag, and Cond, in this example are variables, and the rule shown in FIG. 2 is an example of logic programming written in a logical language such as Prolog or Datalog.) It is noted that the uses of the "diagnosis" and "condition" predicates in the rule have the variable "Diag" in common, thereby suggesting that an expression involving these predicates can be calculated by a join (or some other relational operation) on the relational database tables that correspond to instances of the subject-object tuples connected by these predicates.

In a typical arrangement, information is stored in a relational database, which may be queried through relational query languages, such as Structured Query Language (SQL). Since one may want to issue semantic queries (of which one example is a graph query issued in a language like SPARQL), a client is typically provided that receives the semantic query, and then executes the query by retrieving information from the relational database. The client may then perform logical reasoning on the query as appropriate, and may issue further relational queries based on the reasoning that has been performed. Executing a semantic query typically involves a sequence of actions in which a relational query is issued to obtain some information from the relational database, then some type of evaluation of the retrieved information is performed, then one of more additional relational queries are generated based on the result of the evaluation, and so on. For example, a scenario is shown above in which a SQL query is issued to retrieve the contents of a "Brother" table, determines how many people are listed in the table and what the names of those people are, and then issues an SQL query for each person listed in the table. (However, the subject matter herein may be used to optimize the Brother/Father example so that it can be answered with a single relational query.) The use of a client that processes semantic queries, and the use of a relational database to store information, is shown in FIG. 3.

In FIG. 3, client 302 is an application that receives and processes semantic queries, such as semantic query 304. Client 302 may comprise, or make use of, rules 306, a logic engine 308, a semantic query engine 310, and a relational query generator 312. For example, semantic query engine 310 may receive semantic query 304. As part of executing semantic query 304, client 302 may generate one or more relational queries 314 to be submitted to relational database 316. Semantic query engine 310 may use relational query generator 312 to generate these queries. Additionally, as part of executing semantic query 304, client 302 may perform various logical deductions. Semantic query engine 310 may use logic engine 308 to perform these logical deductions. For example, logic engine 308 could be a Prolog interpreter, a Datalog interpreter, etc. Rules 306 are the rules that logic engine 308 may use to perform logical deductions. For example, rule 202 (shown in FIG. 2) might be one of rules 306. Thus, if semantic query 304 contains an expression involving the diagnosed_with_condition relation, semantic query engine 310 may use logic engine 308 to perform logical reasoning that involves rule 202 and some underlying set of data. Additionally, as described herein, client 302 may use rules 306 to expand a semantic query into grounded terms, thereby allowing the semantic query to be converted into a relational query that provides an answer by calling for joins (or other relational operations) on tables that exist in a relational database.

Relational database 316 may store the data on which client 302 operates. For example, tables 102, 104, and 106 (introduced in FIG. 1) may be stored in relational database. Relational database 316 may include a relational query processor 318. When client 302 provides relational queries 314 to relational database 316, relational query processor 318 may generate results 320 in response to the queries. Client 302 may then use results 320 to answer the semantic query 304 that was submitted to client 302. Client 302 may then issue results 322 based on the results that client 302 received from relational query processor 318. The results 322 that client 302 issues may be the same as the results 320 that were received from relational query processor 318, or may be derived from results 320 in some manner. For example, client 302 may use logic engine 308 and rules 306 to deduce some conclusion from results 320, and may provide those conclusions in the form of results 322.

Figure 4:
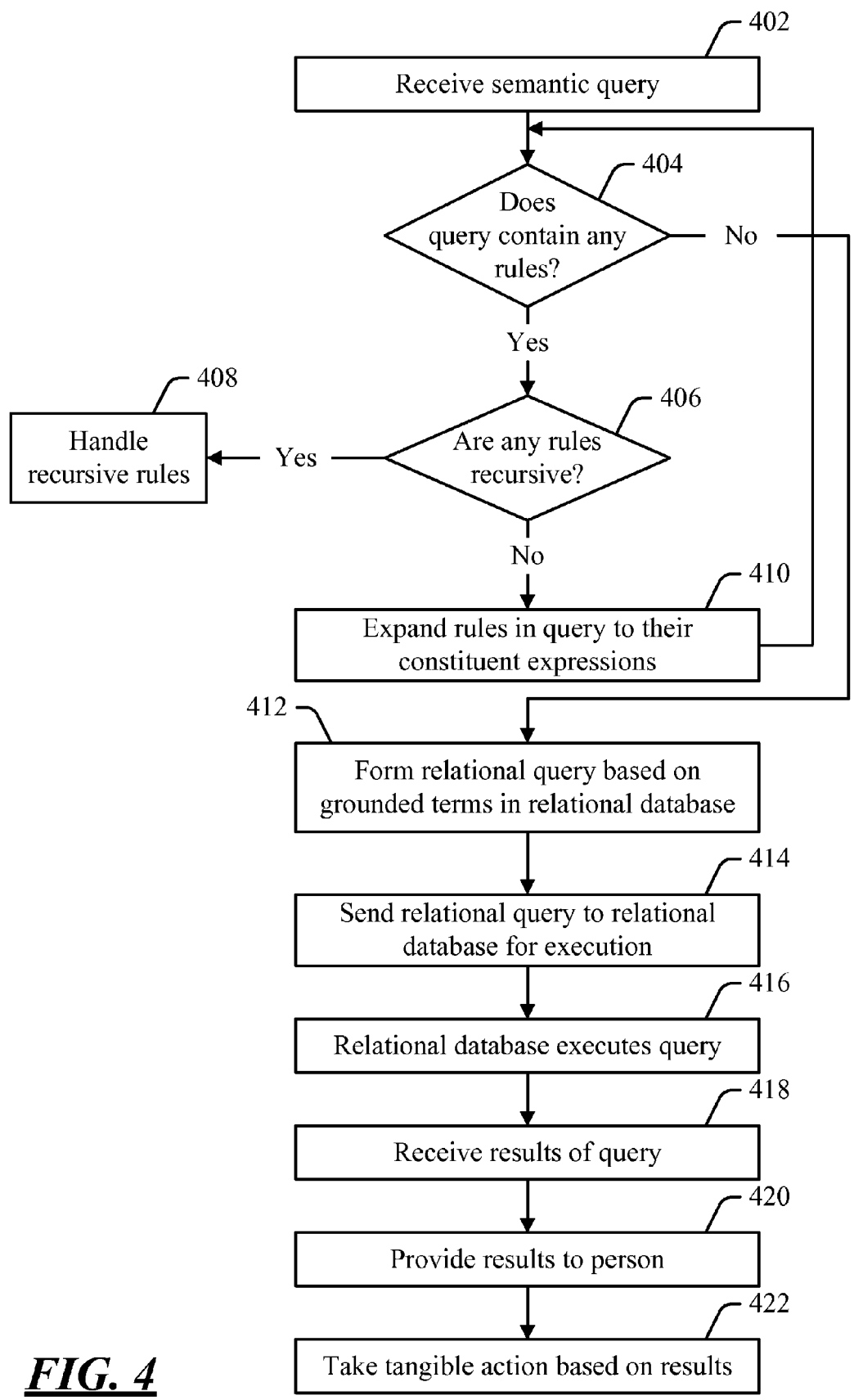
FIG. 4 is a flow diagram of an example process in which a semantic query may be processed by expanding rules into grounded terms.

FIG. 4 shows an example process in which a semantic query may be processed by expanding rules into grounded terms. Before turning to a description of FIG. 4, it is noted that FIG. 4 is described, by way of example, with reference to components shown in FIGS. 1-3, although the process of FIG. 4 may be carried out in any system and is not limited to the scenario shown in FIGS. 1-3. Additionally, the flow diagram of FIG. 4 shows an example in which stages of a process are carried out in a particular order, as indicated by the lines connecting the blocks, but the various stages shown in these diagrams can be performed in any order, or in any combination or sub-combination.

At 402, a semantic query may be received. A graph query, such as a SPARQL query, is an example of a query that may be received at 402, although any kind of semantic query could be received.

At 404, it is determined whether the query contains any rules. If the query does not contain any rules (i.e., if the query contains only terms that are grounded in the underlying database), then the process continues to 412, where a relational query is formed. On the other hand, if it is determined at 404 that the semantic query does contain rules, then it is determine (at 406) whether any of the rules are recursive. For example, a rule such as "A(X,Y):-A(Y,Z),B(X,Z)" is recursive in the sense that rule A is defined in terms of another application of rule A. (The foregoing is an example of direct recursion, although a rule also could be found to be mutually recursive through a chain of several rules.) If the rule is found to be recursive, then the expansion of the recursive rule is handled at 408. The expansion of recursive rules may be addressed differently from the expansion of non-recursive rules; the subject matter herein addresses the expansion of non-recursive rules.

At 410, the rules in the semantic query are expanded into their constituent expressions, thereby creating an expanded semantic query. For example, if the "diagnosed-with-condition" rule in described above appears in a semantic query, this rule may be expanded into an expression involving the "diagnosis" and "condition" relations, since the rule is defined in terms of those relations. Following the expansion, the process returns to 404 to determine whether the semantic query still contains any rules. In the example of the "diagnosed_with_condition" rule, the constituent expressions of which that rule is formed are both grounded terms that exist in the underlying relational database. However, a rule could be defined in terms of other rules, so that replacement of the rule with its constituent expressions simply leads to a new expression involving rules. Thus, after an expansion is performed, the process loops back to 404 to determine whether there are any remaining rules left to expand. After some number of cycles, it will be determined, at 404, that there are no rules left to expand, and the process will proceed to 412. In general, a rule that is non-recursive may comprise grounded terms (if the definition of the rule specifies the grounded terms directly), or the rule may be reducible to grounded terms (if the definition of the rule includes other rules which, themselves, can be reduced to grounded terms by repeating the expansion process some finite number of times).

Once 412 is reached, a relational query is formed, where the relational query is expressed using grounded terms in the relational database. For example, if "diagnosis" and "condition" are tables or views that exist in the relational database, then "diagnosis" and "condition" are grounded terms on which a relational query processor can execute a query. A relational query that is written using such terms is sent to the relational database for execution (at 414). The relational database's query processor then executes the query (at 416), and results of the query are received by the semantic query engine (at 418). The semantic query engine may then provide results to a person (at 420). The results that are provided may simply be the results to the relational query that were received from the relational database. Or, the semantic query processor may receive the results from the relational database, and may then provide some other set of results that are based on the results that the relational database provided.

At 422, a tangible action may be taken based on the results of the semantic query. For example, as described above, the underlying data involved in the query may be medical data that relates to the diagnosis or treatment of a human body (or that is otherwise descriptive of a human body or of a process performed with respect to the human body). Thus, the result of the query may be used to determine, or otherwise to affect, a course of treatment of a human body, or to perform analysis of the body, or to perform some other tangible action. Another example of a tangible action that may be taken is to present the result of a query in a physical form. Any sort of tangible action may be taken.

Figure 5:
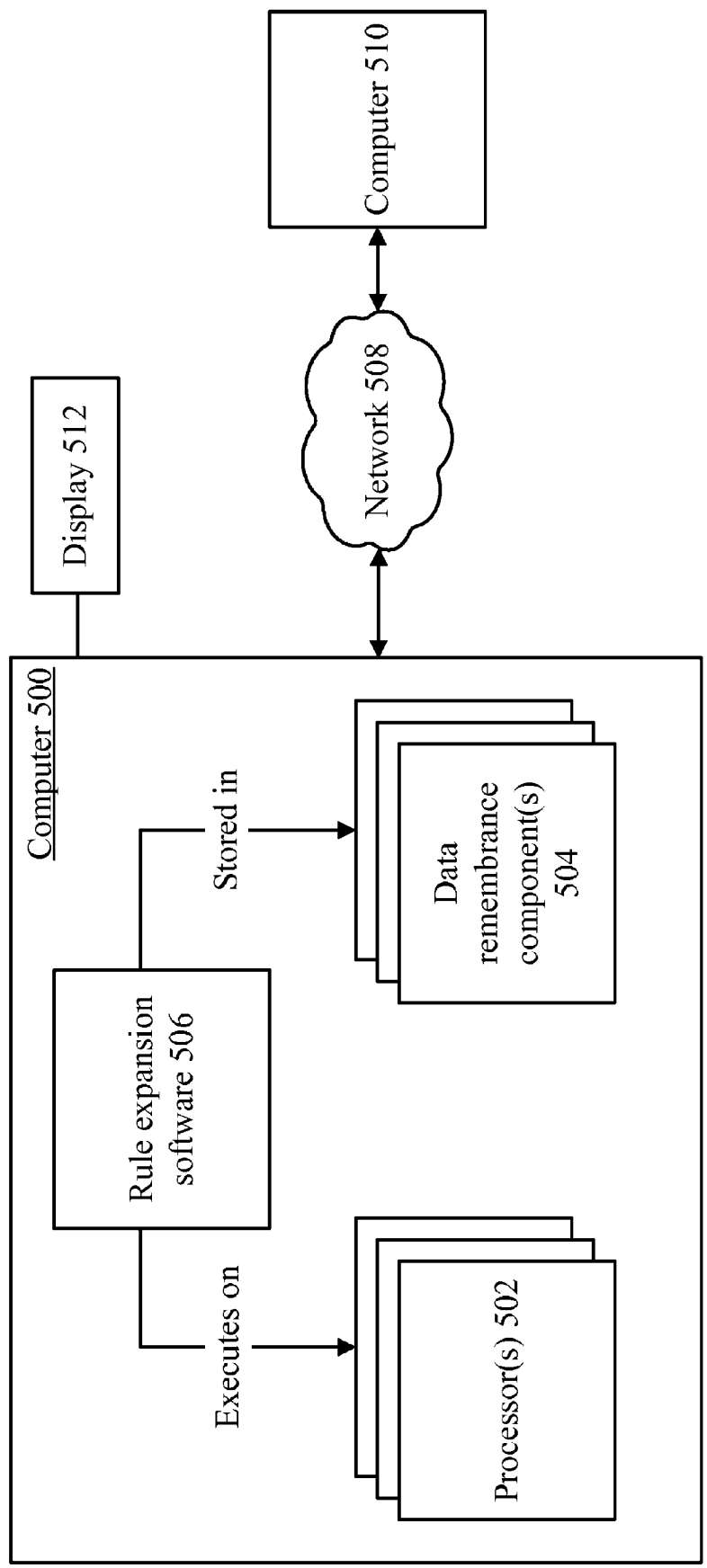
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is rule expansion software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions that, when executed by a computer, cause the computer to perform first acts comprising:
    receiving a semantic query;
    determining that said semantic query comprises a first rule that comprises one or more constituent terms, each of said constituent terms comprising, or being reducible to, one or more grounded terms in a relational database, each of said grounded terms corresponding to a table or a view in said relational database;
    creating an expanded semantic query by performing second acts comprising replacing said first rule with said first rule's constituent terms;
    forming a relational query based on said expanded semantic query;
    sending said relational query to a relational query processor of said relational database; and
    receiving a result from said relational query processor.

2. The one or more computer-readable storage media of claim 1, wherein a first one of said constituent terms is a rule, and wherein said first acts further comprise:
    repeatedly expanding said first one of said constituent terms until a term is reached that is grounded in said relational database.

3. The one or more computer-readable storage media of claim 1, wherein each of the grounded terms in said relational database is a table or view that corresponds to a given predicate, wherein each table or view comprises a subject and an object of a predicate to which the table corresponds, and wherein said relational query comprises a join of a plurality of the tables or views.

4. The one or more computer-readable storage media of claim 1, wherein said first acts further comprise:
    determining that said first rule is not recursive.

5. The one or more computer-readable storage media of claim 1, wherein said semantic query comprises a SPARQL query.

6. The one or more computer-readable storage media of claim 1, wherein said first acts further comprise:
    taking a tangible action based on said result.

7. The one or more computer-readable storage media of claim 6, wherein said tangible action comprises:
    presenting, to a person, a description of a condition of a human body or of a treatment of said human body.

8. The one or more computer-readable storage media of claim 6, wherein said tangible action comprises:
    affecting a course of treatment of a human body.

9. A system for answering a semantic query, the system comprising:
    a semantic query engine that receives the semantic query, the semantic query comprising a first rule that comprises one or more constituent terms that comprise, or are reducible to, one or more grounded terms in a relational database;
    a relational query generator that expands the semantic query into an expanded semantic query by replacing said first rule with its constituent terms, said relational query generator generating a relational query based on said expanded semantic query and submitting said relational query to said relational database; and
    said relational database, which stores tables corresponding to said grounded terms, each of said tables corresponding to a predicate and defining subject and object pairs that are related by said predicate, said relational database providing a result in response to said relational query by performing relational operations on said tables.

10. The system of claim 9, wherein one of said constituent terms is a second rule, and wherein said relational query generator generates said expanded semantic query by repeatedly replacing rules with their constituent terms until said grounded terms are reached.

11. The system of claim 9, wherein said relational query generator determines that said first rule is not recursive.

12. The system of claim 9, wherein, in absence of expansion of said first rule, said relational query generator generates a first relational query for a first one of said constituent terms, and then generates one or more additional relational queries based on a response to said first relational query, and then obtains, from said relational database, information that responds to said first rule by issuing only a single relational query.

13. The system of claim 9, wherein said semantic query comprises a SPARQL query.

14. The system of claim 9, wherein said first rule comprises, or is reducible to, grounded terms that comprise a first grounded term and a second grounded term, wherein said first grounded term and said second grounded term are related in said first rule by a common variable, wherein said relational query calls for performing a join on a first column of a first table that corresponds to said first grounded term, and a second column of a second table that corresponds to said second grounded term.

15. The system of claim 9, wherein said relational query generator presents information, based on said result, that describes a human body or a treatment of said human body.

16. The system of claim 9, wherein said system affects a course of treatment of a human body based on said result.

17. A method of processing a first query that includes a first rule, the method comprising:
  using a processor to perform acts comprising:
    receiving said first query;
    determining that said first query comprises said first rule, wherein said first rule comprises, or is reducible to, a set of grounded terms comprising a first grounded term and a second grounded term;
    expanding said first query into a second query that comprises said first grounded term and said second grounded term;
    generating a third query based on said second query, said first query being a semantic query, said third query being a relational query that calls for relational operation on tables or views, in a relational database, that correspond to said first grounded term and said second grounded term;
    receiving a first result of said third query from said relational database; and
    providing said first result, or a second result based on said first result, to a person.

18. The method of claim 17, further comprising:
  using a processor to perform acts comprising:
    presenting, based on said first result or said second result, a description of a human body or of a treatment of said human body; or
    affecting a course of treatment of said human body based on said first result or said second result.

19. The method of claim 17, further comprising:
  using a processor to perform acts comprising:
    determining that said first rule is not recursive.

20. The method of claim 17, wherein said first rule comprises a second rule, and wherein the method further comprises:
  using a processor to perform acts comprising:
    repeatedly expanding said first rule until said second rule, and any rules that said first rule comprises or is reducible to, have been reduced to said set of grounded terms.

* * * * *